July 12, 1927.
J. E. REED
WINDSHIELD ATTACHMENT
Filed March 21, 1925
1,635,906
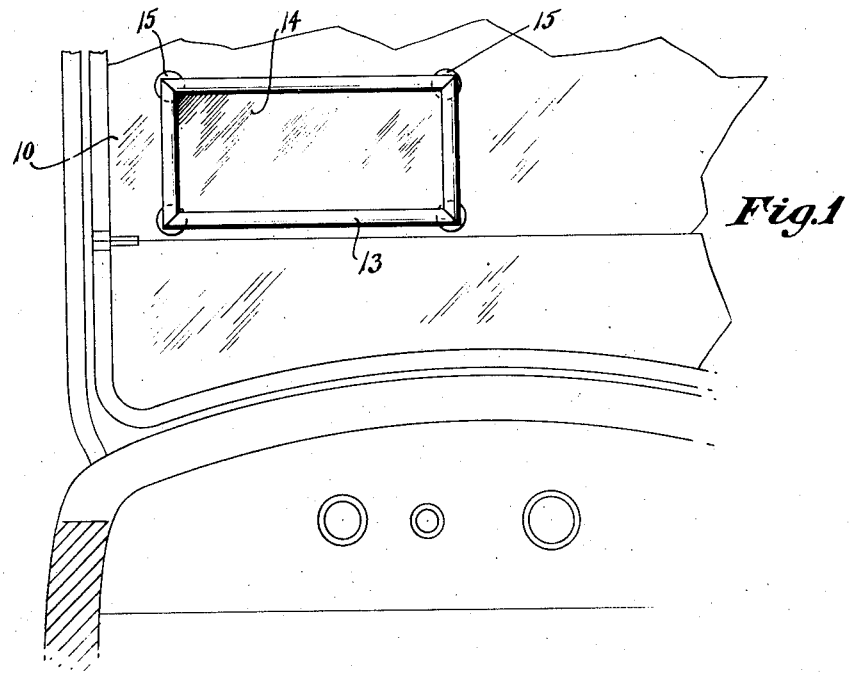
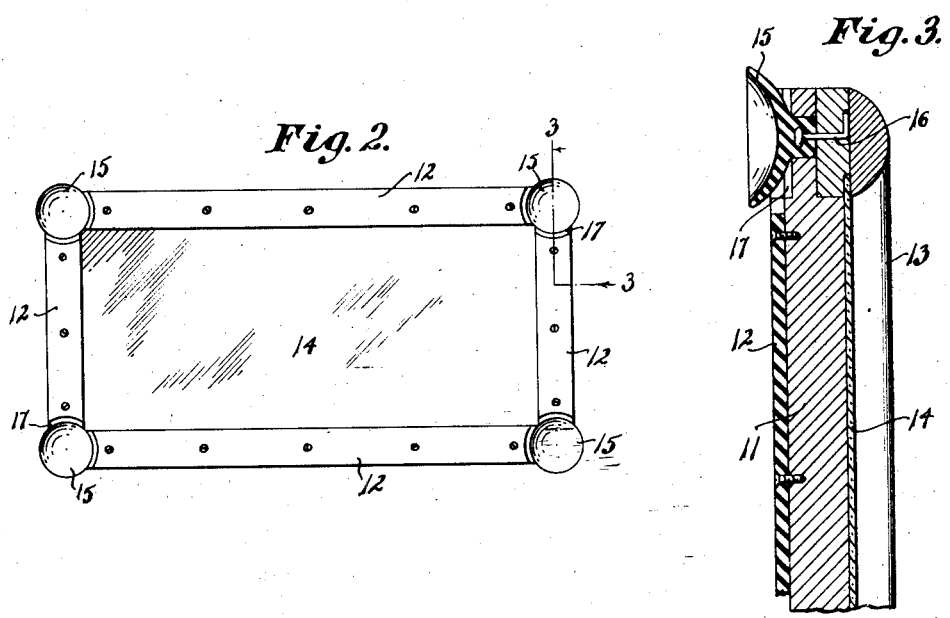
John E. Reed,
INVENTOR
WITNESS:

Patented July 12, 1927.

1,635,906

UNITED STATES PATENT OFFICE.

JOHN E. REED, OF QUINTER, KANSAS.

WINDSHIELD ATTACHMENT.

Application filed March 21, 1925. Serial No. 17,300.

This invention relates to attachments for motor vehicles and has particular relation to window or windshield attachments, an object being to provide means adapted to be removably secured in place to prevent the accumulation of frost or moisture which sometimes interferes with the vision of the driver.

To this end, the invention provides a transparent panel having means to permit of its ready attachment to a window or windshield for the purpose of providing a dead air space between the panel and window or windshield and thus insure clear vision therethrough.

With the above and other objects in view, the invention further includes the following novel features and details of construction, to be hereinafter more fully described, illustrated in the accompanying drawings and pointed out in the appended claims.

In the drawings:—

Figure 1 is a fragmentary view looking at the inner side of the windshield of an automobile with the invention applied.

Figure 2 is an elevation of the invention per se.

Figure 3 is an enlarged fragmentary section on the line 3—3 of Figure 2.

Referring to the drawings in detail wherein like characters of reference denote corresponding parts, the reference character 10 indicates a portion of a windshield to which the invention is shown applied.

The invention comprises a frame 11 having one of its faces provided with a compressible cover or lining 12 which is adapted to contact with the windshield. Secured to the opposite face of the frame by any suitable means, such as a molding 13 is a glass or other transparent panel 14. This panel will thus be spaced from the adjacent face of the windshield so as to provide a dead air space and prevent the accumulation of frost or moisture.

For the purpose of removably securing the device in place, each corner of the frame carries a rubber or other compressible vacuum cup 15 which is secured to the frame by fastening devices 16 and which when compressed against the windshield is adapted to occupy a recess 17 provided in each corner of the frame. This permits of the frame being secured to the windshield with the lining 12 in close contact with the latter.

While the invention is shown as applied to a windshield it is of course obvious that it may be applied also to the windows of closed cars.

The invention is susceptible of various changes in its form, proportions and minor details of construction and the right is herein reserved to make such changes as properly fall within the scope of the appended claim.

Having described the invention what is claimed is:—

The combination with a vehicle window or windshield, of an attachment comprising a frame adapted to engage against the window or windshield, a compressible cover for the engaging face of the frame, a transparent panel secured to the frame and spaced from the engaging face of the latter to provide a dead air space between the window or windshield and the panel, said frame having recesses in the engaging face thereof and interrupted portions at the corners of the compressible lining at said recesses and rubber vacuum elements carried by the frame to removably secure the panel frame in position, said elements being disposed within the recesses when the panel is in use.

In testimony whereof I affix my signature.

JOHN E. REED.